Aug. 23, 1927.
H. O. HEM
1,640,078
RECORDING WEIGHING SCALE
Filed Jan. 26, 1920     2 Sheets-Sheet 2
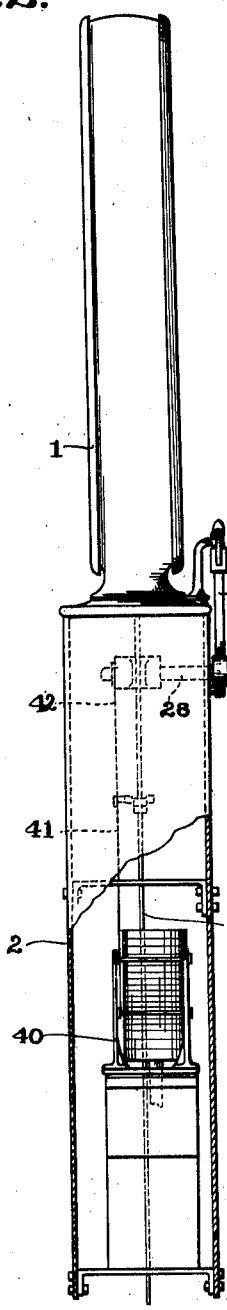
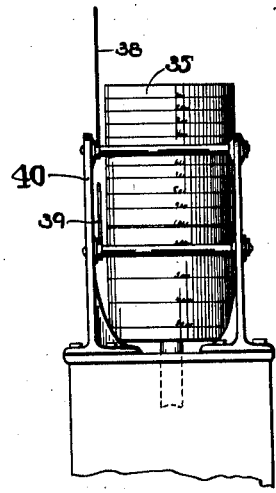
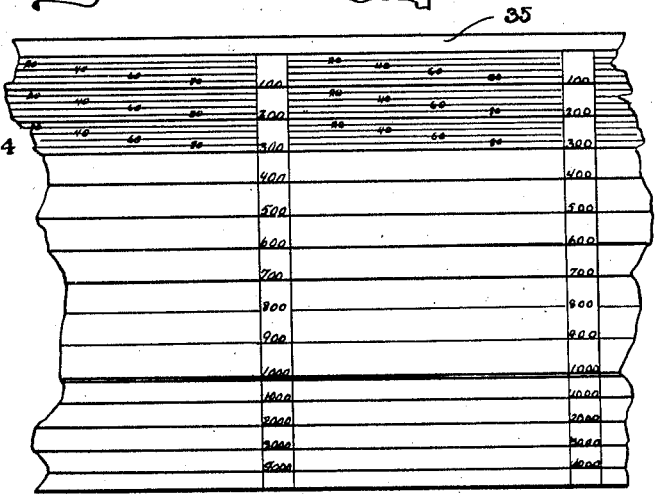
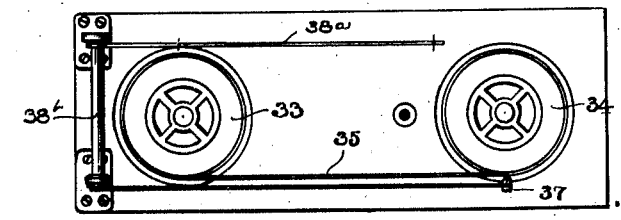
Witnesses.
C. C. Wilcox
Inventor
Halvor O. Hem.
By George R. Frye
Attorney Patented Aug. 23, 1927.

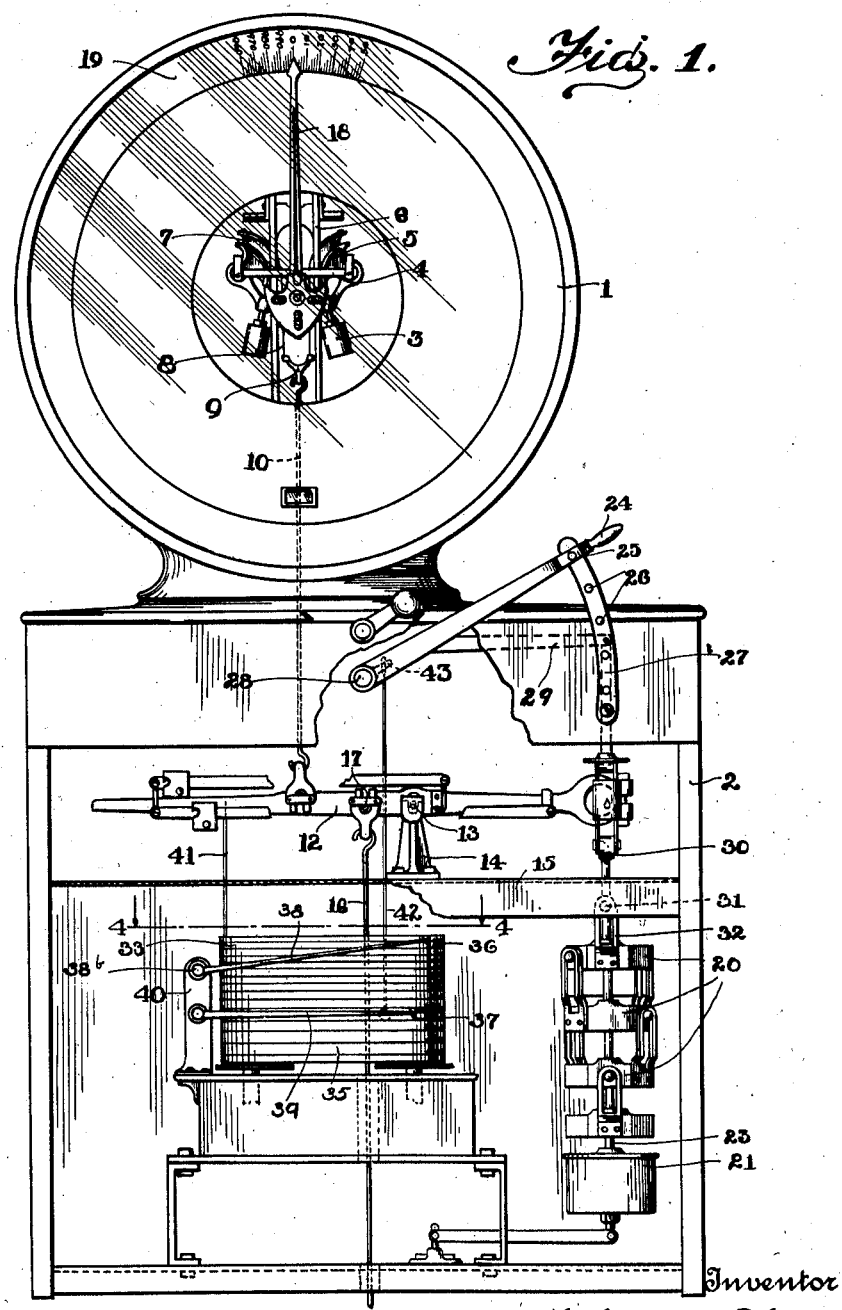

1,640,078

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

RECORDING WEIGHING SCALE.

Application filed January 26, 1920. Serial No. 354,143.

This invention relates to scales, and has for one of its objects the provision of a machine for automatically recording the weights of a series of loads.

In scales which form parts of instruments which are used to measure fluctuating forces, the indicator shows the load on the scale at any particular moment, but the extent and frequency of the fluctuations can only be determined by keeping a record of the movements of the weighing mechanism. One of the objects of this invention is to provide means for automatically keeping such a record.

The power delivered by a prime-mover can sometimes be best indicated by plotting a curve, the abscissas representing the times at which certain strains were indicated, while the values of such strains are represented by the ordinates. Another object of this invention is to provide means for automatically tracing such a curve.

A further object is the provision of a scale capable of making a graphic record of its performance during an extended period, showing not only the weights of the various loads, but the approximate time of day each draft is weighed, from which can be readily determined the rush hours of each work-day and the number of drafts passing over the scale.

Another and more specific object is the provision of a scale having both automatic and manipulative load-balancing mechanism and a device to automatically record the operation of each.

With the above and other objects in view which will readily appear as the invention is better understood, my invention consists in the novel construction, combination and arrangement of elements to be hereinafter more fully described and particularly pointed out in the subjoined claims.

Reference is to be had to the accompanying drawings illustrating a preferred embodiment of my invention and wherein similar reference numerals designate similar parts throughout the several views.

In the drawings:—

Figure 1 is a front elevation of the head and cabinet of a scale, part of the cabinet being broken away to show the weighing and recording mechanism, and part of the weighing mechanism being also broken away;

Figure 2 is a side elevation of the head and cabinet, part of the latter being broken away to expose the recording device;

Figure 3 is an enlarged side elevation of the recording device;

Figure 4 is an enlarged plan view of the same, taken on the line 4—4 of Figure 1; and Figure 5 is a further enlarged fragmentary elevation showing the markings on the traveling chart.

In order that this invention and its manner of operation may be readily understood, I have shown it as embodied in a scale having weighing mechanism of a type now in extensive use, which comprises automatic load-offsetting mechanism housed in a head 1 and manipulative load-offsetting mechanism housed in a cabinet 2 which supports the head 1.

The automatic load-offsetting mechanism is of the pendulum type, comprising a pair of pendulums 3 connected by means of a compensating frame 4 and having fulcrum sectors 5 rockably supported adjacent the vertical faces of sector guides 6. The pendulums also carry power sectors 7 connected by means of flexible steel bands or ribbons 8 to an equalizer 9 which is in turn connected by means of a link 10 to the beam lever 12 of the scale. The beam lever is fulcrumed at 13 on a bracket 14 supported on the shelf 15 which divides the cabinet 2 into upper and lower compartments. A steelyard 16 leading from the platform levers (not shown) is pivotally connected to the lever 12 at 17.

When a load is placed upon the platform (not shown) of the scale, or force is applied to a dynamometer torque transmitting element or other transmission mechanism connected to the scale, the steelyard 16 is pulled downwardly, rocking the lever 12 upon its fulcrum and pulling downwardly upon the link 10. This results in a downward pull upon the ribbons 8 and power sectors 7, whereby the pendulums are swung outwardly and upwardly until the load on the platform is offset. As the pendulums 3 swing outwardly the fulcrum sectors 5 rock upwardly over the faces of the sector guides 6 and the compensating frame 4 is moved upwardly.

By means of a rack and pinion connection (not shown) between the compensating frame 4 and the indicator 18, the indicator is swung over the dial 19 and thus automatically indicates the weight of the load on the platform so long as the weight of the load is within the capacity of the automatic weighing and indicating mechanism.

For offsetting loads, the weights of which are beyond the capacity of the automatic mechanism, a series of unit weights 20 is employed. These unit weights are suspended above a pan 21 connected by means of a rod 23 to the end of the beam lever 12. Placing a unit weight 20 on the pan 21 obviously balances a definite part of whatever load is on the scale platform, and the unit weights are, in practice, sealed to counterbalance a weight which is equal to that offset by the automatic mechanism at the full capacity of the chart. In order that the unit weights 20 may be conveniently manipulated, a handle 24 is provided. Said handle carries a latch 25 adapted to selectively engage a series of openings 26 in an arcuate guide bar 27 secured to the cabinet 2 and the handle is rigidly attached to a rock shaft 28 mounted in the cabinet. An angle arm 29 is rigidly secured to the rock shaft 28 and extends therefrom to a point above the center of the pan 21. A link 30 depends from said arm, and suspended therefrom by means of pins 31 and slotted ears 32 is the uppermost of the unit weights 20. The next weight is suspended from the uppermost weight by similar ears and pins, and so on. If the handle 24 is moved downwardly until the latch 25 engages the adjacent opening 26, the lowermost weight 20 will be deposited on the pan 21 and the slots in the ears carried by the said weight will extend somewhat above and below the pins in the adjacent weight so that the weights which are still suspended will not interfere with the free movement of the beam lever 12. The remaining weights may be successively deposited by lowering the handle 24 and then lifted in inverse order by raising the handle.

Since the present invention does not reside in the weighing mechanism per se, I have shown and described it only in such detail as is necessary for clear understanding of its co-operation with the recording mechanism.

The recording device comprises a pair of drums 33 and 34 rotated by clockwork or other means (not shown), a flexible chart 35 of paper or the like which is unwound from one of the drums and wound upon the other as the drums are rotated, and a pair of styli 36 and 37 carried by arms 38 and 39, pivoted to the stationary bracket 40 and suitably connected to the weighing mechanism.

A light link 41 is pivoted at one end to the beam lever 12 and at the other end to an arm 38ª mounted at the rear of the chart 35 upon the rock-shaft 38ᵇ which carries adjacent the front of the chart the stylus arm 38, and serves to transmit movement of said lever to the said arm. The movement of the stylus is therefore proportional to the movement of the beam lever, which in turn is proportional to the movement of the load-offsetting mechanism and the indicating hand 18 controlled thereby.

The upper portion of the chart co-operates with the stylus 36 and is divided by parallel lines, the spaces between which in the illustrative example shown in Figure 5 correspond in width to the vertical movements of the stylus 36 resulting from movement of the automatic weighing mechanism to balance a load of 20 lbs. Pairs of vertical lines are placed at intervals upon the chart, and between the lines of each pair every fifth horizontal line only appears, the spaces between the said lines thus corresponding in height to the vertical movement of the stylus 36 caused by a 100 lb. load on the scale, thereby facilitating the reading of the chart.

The stylus 36 is so related to the chart 35 that when a load is applied to the scale the stylus moves downwardly over the face of the chart to the position relative to the graduations on the chart corresponding to the position of the hand 18 relative to the graduations on the dial 19. Since the chart is moved laterally, an irregular line will be traced thereon by the stylus, the lower ranges of which record the portions of loads offset from time to time by the automatic weighing mechanism, or, in case the scale is used to measure a fluctuating force, the curves and cusps in the line will record the fluctuations.

The arm 39 which carries the stylus 37 is connected by means of a light link 42 to a short arm 43 rigidly carried by the rock shaft 28, and the parts are so proportioned that when the handle is moved downwardly to deposit the lowermost weight 20 on the pan 21 the stylus will move downwardly over the chart to the line marked 1000 (see Figure 5). When the next unit weight is deposited upon the pan, the stylus 37 will move to the line marked 2000, and so on. The stylus 37 will thus trace a line which includes the weighings made by using the unit weights and registers the parts of the loads offset thereby. The total force exerted by any particular load is, of course, the sum of the forces simultaneously recorded by the two styli.

While it will be apparent that the illustrated embodiment of my invention herein disclosed is well calculated to adequately fulfill the objects primarily stated, it is to be understood that the invention is susceptible to variation. modification and change within the spirit and scope of the subjoined claims.

Having described my invention, I claim:

1. In a scale, in combination, automatic weighing mechanism, manipulative weighing mechanism, and means operatively connected with said weighing mechanisms for making a graph record of the operations of said weighing mechanisms.

2. In a scale, in combination, automatic weighing mechanism, manipulative weighing mechanism, and means connected to and under the control of said weighing mechanisms for automatically making a graph record of the operations of said weighing mechanisms.

3. In a scale, in combination, automatic weighing mechanism, manipulative weighing mechanism, a recording device comprising a chart and graph tracing means, said chart and graph tracing means being movable relatively to each other, and connections between said weighing mechanisms and said recording device.

4. In a scale, in combination, automatic weighing mechanism, manipulative weighing mechanism, a chart, graph tracing means connected to said automatic weighing mechanism, and graph tracing means connected to said manipulative weighing mechanism, said graph tracing means being in co-operative relation with said chart.

5. In a scale, in combination, automatic weighing mechanism, manipulative weighing mechanism, a movable chart, a stylus operatively connected to said automatic weighing mechanism, and a stylus operatively connected to said manipulative weighing mechanism, said styli being arranged to trace graphic records on said chart.

6. In a scale, in combination, counterbalance weights, a counterbalance weight receiving pan, a handle for placing said counterbalance weights on said pan, and a device for automatically recording the loads offset by the weights placed on said pan.

7. In a scale, in combination, counterbalance weights, a counterbalance weight receiving pan, a handle, means operated by said handle to place said counterbalance weights on said pan, and a recording device comprising a chart and a stylus connected to said handle to be moved over said chart.

8. In a scale, in combination, automatic weighing mechanism, manipulative weighing mechanism, including counterbalance weights and a handle to place said weights in weighing position, a movable chart, a stylus co-operating therewith and connected to said automatic weighing mechanism, and a stylus co-operating with said chart and connected to said handle.

9. In a scale, in combination, means for offsetting definite parts of loads, means for offsetting the remainders of such loads, and means for automatically making a graph record of the operations of said load-offsetting means.

HALVOR O. HEM.